Jan. 17, 1961 G. MÖHRING 2,968,084
COMBINED FEELER GRIPPER AND PIN-SET CHAIN LINK
Filed April 19, 1957 2 Sheets-Sheet 1

INVENTOR
Gustav Möhring
By Lowry + Rinehart
ATTORNEYS

Jan. 17, 1961     G. MÖHRING     2,968,084
COMBINED FEELER GRIPPER AND PIN-SET CHAIN LINK
Filed April 19, 1957     2 Sheets-Sheet 2
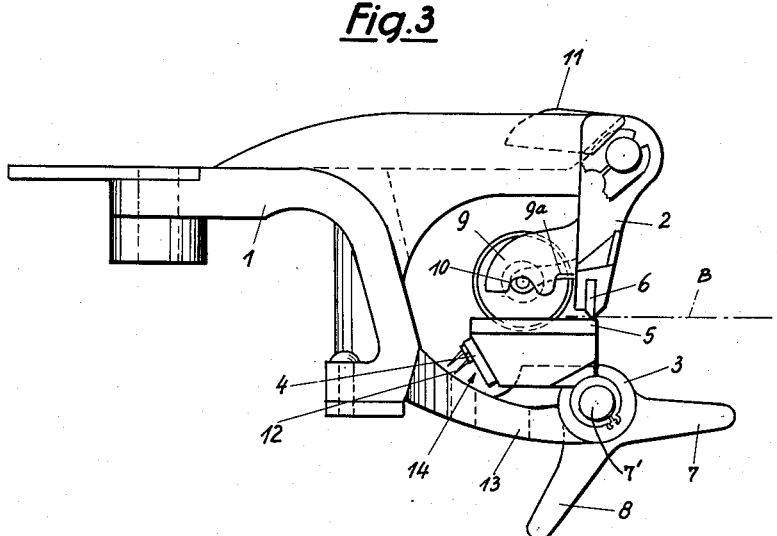
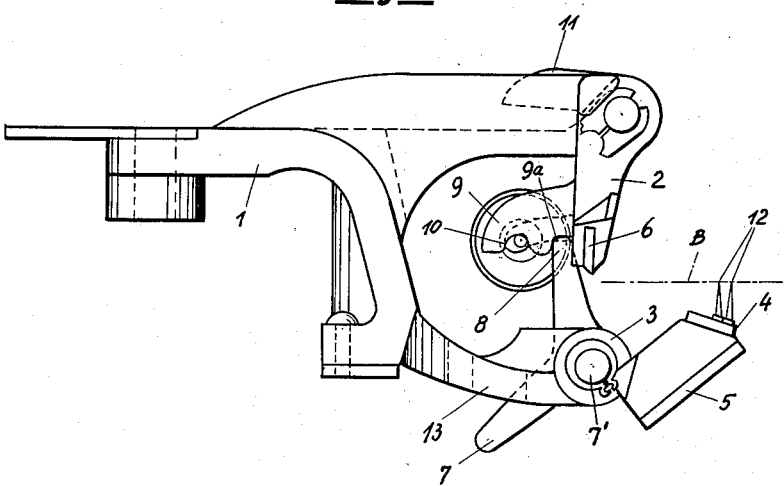
INVENTOR
Gustav Möhring
By Lowry & Rinehart
ATTORNEYS United States Patent Office 2,968,084
Patented Jan. 17, 1961

2,968,084

COMBINED FEELER GRIPPER AND PIN-SET CHAIN LINK

Gustav Möhring, Stuttgart, Germany, assignor to Famatex G.m.b.H., Stuttgart-Kornwestheim, Germany Filed Apr. 19, 1957, Ser. No. 653,939

Claims priority, application Germany Apr. 28, 1956

7 Claims. (Cl. 26—62)

The invention relates to a combined gripper and pin-set chain link, especially for fabric stretching and drying machines.

It is known in the art to provide combined chain links with a pivoted link part which has both a pin rack and also a gripper supporting surface and which, in this manner, according to its position, serves selectively as a pin-set chain link or, together with a gripper blade arranged oscillatably above it, as a feeler gripper.

In a simple form of construction of this type which has become known, this link part must, however, be removed from its bearing and replaced after being turned through an angle of 180° every time it is desired to change over from pins to gripper. As the change-over must naturally be carried out on all the chain links of the fabric conveyor chain, it requires a considerable amount of time. The fact that the pin rack is unprotected when it is not in an operative position constitutes a further disadvantage. The pins are freely accessible from below. They can easily become damaged and cause injury to the operator serving the machine. The fabric also is susceptible to damage, if it should catch on the pins when being released, and consequently be torn.

In an improved form of construction the above-mentioned objections have been overcome in that although the pin rack and the link part forming the supporting surface still have to be turned through an angle of 180°, the pin rack is completely protected when it is in its inoperative position. However, when the pin rack is in use, the gripper blade rests loosely on the gripper table in its idle position. Due to the vibrations and shaking movements caused by the running chain, the gripper blade becomes blunt by striking against the gripper table. Only one operative and inoperative position is provided for the pin rack. Intermediate positions, such as are desirable, for example, for slipping onto or removal of the fabric from the pins, are not provided in this form of construction.

In order to avoid the disadvantages of the known combined chain links it is the object of the present invention to provide a combined feeler gripper and pin-set chain link which comprises an oscillatable feeler gripper yoke. It also includes a holding unit consisting of a pin rack and a gripper table oscillatably mounted about a horizontal axle below said feeler gripper yoke and so constructed as to form a part of a locking arrangement with at least one locking stage for arresting said pin rack of the holding unit of the chain link in its operative positions without using springs or other means.

For the purpose of facilitating the slipping onto and removal of the fabric from the pins when using the pin rack, it is proposed to swing the oscillatable holding unit so far beyond the normal operating position during the loading and removal of the fabric that the pins stand perpendicularly to the fabric web, thereby ensuring that the web is properly engaged by and disengaged from the pins. At the same time it has been found that the pins should, according to the invention, be preferably fixed in the pin plate at an exaggerated inclination, preferably at an angle of between 45° to 70° to the pin rack, in order to prevent the web from slipping off the pins into the interior of the drying machine when the pin rack is in horizontal or normal operating position.

Furthermore, in the case of a two-row pin rack for example, the outer row which is located towards the web, should consist of pins of greater length. Thus when the pin rack is lowered into the engaging position the points of the pins located in different rows are at the same height in the plane of the fabric web and penetrate the web simultaneously during the loading operation. In this manner the web is engaged by the pins in a perfect manner. When the fabric has been slipped onto the pins the pin rack is brought into its normal operating position by turning the holding unit and locked in this position. The above-mentioned exaggerated inclination of the pins reliably prevents the web from slipping off the pins while running through the machine.

When removing the web from the stretching chains the pin racks are returned to the position in which the pins stand perpendicularly to the fabric web. Thus the edge of the material is not torn as heretofore, by the inclined pins when being removed therefrom, but is pushed off the perpendicular pins without being damaged.

This novel arrangement and construction of the combined chain link can be mechanically reversed in a simple manner, for example by means of guide rails (not shown). It requires but little space and can be controlled by simple means, because the working positions, once set, are automatically maintained. The force by which the locked parts are held increases as the stretch in the width direction of the web becomes greater, so that the web is firmly locked under any tension stresses which may occur.

A preferred embodiment of the invention is illustrated by way of example in the accompanying drawings, in which:

Fig. 3 is a side elevation of the chain link when being used as gripper, and

Fig. 4 is another side elevation of the chain link with the pin rack in the position for receiving or the removal of the web.

Figure 1:
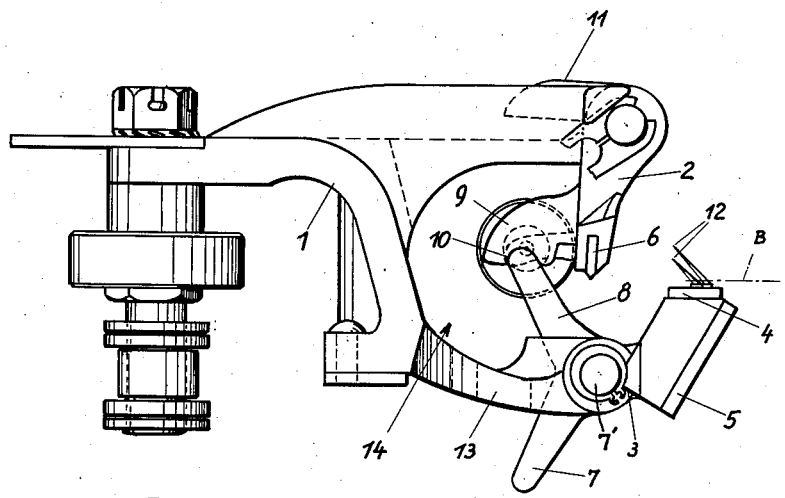
Fig. 1 is a side elevation of a combined gripper and pin-set chain link with a pin rack in operative position.
Figure 2:
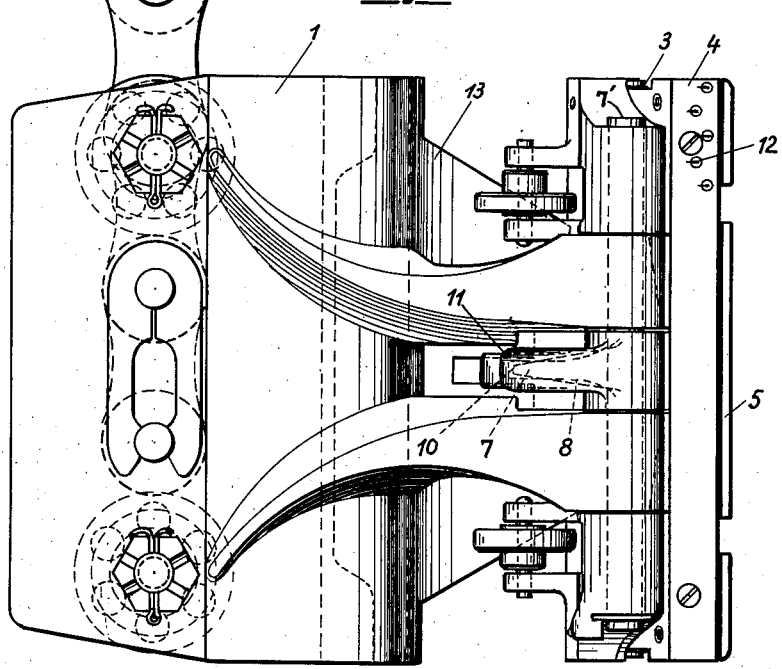
Fig. 2 is a top plan view of the chain link.

The chain link consists substantially of a link body 1, an oscillatable feeler gripper saddle or yoke 2 mounted thereon, and a holding unit 3 oscillatably mounted by suitable shaft means 7' on the link body 1 below the gripper yoke 2 and comprising not only a pin rack 4 with pins 12, but also a supporting or spreading surface 5 serving as a gripper table arranged directly below the pin rack at an acute angle thereto.

Disposed in the middle of the holding unit 3, and oscillatably mounted in a bearing fork 13 of the link body 1, is the shaft means 7' on which is suitably secured a guide projection 7 which serves for swinging the holding unit 3, to the positions desired. For this purpose it will be located, for example, within the range of a guide rail (not shown) in a manner well known in the art. A locking arm 8 is arranged on the holding unit 3 approximately at right angles to the guide projection 7 and, arm 8 together with a latch 9 mounted on the lower part of the gripper yoke 2, form a locking device. The latch 9 is formed by a short arm or extension on the gripper yoke 2 and is provided with locking portions in the form of recesses or notches 10, 9a. An operating arm 11, preferably bent at an angle, is provided on the gripper yoke 2 for actuating said yoke and projects beyond the link and into the effective range of another guide rail or similar operating means (not shown) well known in the art.

The oscillatable holding unit 3 is so formed and mounted in the link body 1 that the pins 12 of the pin rack 4 are capable of assuming two extreme operating positions. When the pins are to be used as retaining means, the holding unit 3 is first swung into one extreme operating position, as shown in Fig. 4, in which the pins 12 are perpendicular to the fabric web B so as to facilitate the slipping of the fabric onto the pins. When the fabric web has been slipped onto the pins, the holding unit is swung through a predetermined angle so that the pins 12 then stand at an inclined angle with respect to the fabric web with their points directed away from the web, as shown in Fig. 1. In this second extreme operating position, by which unintentional slipping off is prevented, the locking arm 8 of the holding unit 3 engages in the recess or notch 10 of the latch 9 with the result that the oscillatable holding unit 3 and the gripper yoke 2 are mutually locked (Fig. 1).

By this means any unintentional swinging movement of the holding unit is prevented and the gripper yoke is firmly held in its idle position.

According to the invention the gripper blade 6 itself or some other engaging possibility might also cooperate with the locking device.

To remove the fabric from the pins, the holding unit 3 is swung back into the first extreme operating position with the pins extending perpendicular to the fabric web.

It is evident that the two parts 2 and 3 can also be locked in relation to each other in the first extreme operating position referred to above for engaging and disengaging the web. For this purpose a second recess 9a must be provided in the latch 9 which recess corresponds to the desired position of the oscillatable holding unit 3.

When using the link as a gripper, the gripper yoke with the latch 9 is first swung upwardly by the operating arm 11 so as to disengage from the locking arm 8. Then, the oscillatable holding unit 3 is turned inwards so that the pin rack 4 is located in a corner 14 formed by the bearing fork 13 and the link body 1, in which position the pins 12 are completely protected. By this last-described swinging movement, which is preferably also effected by guide rails, the gripper table surface 5 has been raised and now forms a horizontal table surface (Fig. 3) which cooperates with the gripper yoke 2 in the usual manner.

From the above detailed description of the invention, it is believed that the construction will at once be apparent, and while there is herein shown and described a preferred embodiment of the invention, it is nevertheless to be understood that minor changes may be made therein without departing from the spirit and scope of the invention as claimed.

I claim:

1. In a combined feeler gripper and pin-set chain link the combination of an oscillatably suspended feeler gripper yoke and latch means on the yoke, a fabric holding unit, said holding unit including a pin rack, a gripper table and a locking member, said rack, table and locking member being mounted to oscillate in unison about a common axis disposed below said feeler gripper yoke, said locking member cooperating with the latch means on said yoke for selectively retaining said holding unit in one of a plurality of positions of use when said table is in an inoperative position.

2. A device as set forth in claim 1, wherein the latch means is firmly connected to the yoke, said latch means having recesses, said locking member comprising an arm formed on the holding unit and cooperating with said recesses to lock said gripper yoke and said holding unit relatively to each other when the unit has been swung into one of said plurality of positions of use.

3. A device as set forth in claim 1 including, a guide projection rigidly connected to the oscillatable holding unit, said guide projection constituting a means for swinging the oscillatable holding unit during operation of the same.

4. A device as set forth in claim 1, wherein the gripper table surface is arranged directly behind the pin rack at substantially an acute angle thereto so that, in operative position with the holding unit swung inwards to its full extent, it lies horizontally below the gripper yoke.

5. The chain link as set forth in claim 1, including a bearing fork upon which said holding unit is mounted, said pin rack being positioned within said bearing fork when said gripper table is in its operative position relative to said gripper yoke.

6. A chain link as set forth in claim 1 wherein said pin rack includes pin means, said latch means including locking portions, said locking member engaging one of said locking portions to position said pin means in one of said positions of use normal to a horizontal plane for engagement with a horizontally disposed web of material to facilitate placement and removal of said web on said pin means, said locking member engaging another of said locking portions in an alternate position to orient said pin means in another position of use in angular relation to said horizontal plane for retaining the web material on said pin means.

7. A chain link as set forth in claim 6; said rack including second pin means projecting from said pin rack in the same direction as said first mentioned pin means and in spaced relation therefrom, said second pin means being of greater length than said first-mentioned pin means.

References Cited in the file of this patent

FOREIGN PATENTS 1,004,530     France  --------------- Nov. 28, 1951